United States Patent

Hwang et al.

[11] Patent Number: 5,815,341
[45] Date of Patent: Sep. 29, 1998

[54] CASSETTE HOLDER LOCKING APPARATUS FOR VIDEO CASSETTE TAPE RECORDER

[75] Inventors: Haksun Hwang; Inki Cheon, both of Seoul; Sang Jig Lee, Kyungki-Do; Pohyoung Koh, Kyungki-Do; Hyeoksoo Park, Kyungki-Do; Sungwoo Choi, Kyungki-Do, all of Rep. of Korea

[73] Assignee: LG Electronics, Inc., Seoul, Rep. of Korea

[21] Appl. No.: 819,202

[22] Filed: Mar. 17, 1997

Related U.S. Application Data

[63] Continuation of Ser. No. 559,487, Nov. 15, 1995, abandoned.

[30] Foreign Application Priority Data

Nov. 15, 1994 [KR] Rep. of Korea .................. 30196/1994

[51] Int. Cl.⁶ .................................................. G11B 5/027
[52] U.S. Cl. ........................................ 360/96.5; 360/96.6
[58] Field of Search ................................ 360/96.5, 96.6, 360/85, 96.1, 95

[56] References Cited

U.S. PATENT DOCUMENTS 5,390,055  2/1995  Maehara et al. .......................... 360/85
5,481,419  1/1996  Fujishiro ................................ 360/96.5

FOREIGN PATENT DOCUMENTS 60-209958  10/1985  Japan .
3-23552   1/1991  Japan .
5-290467  11/1993  Japan .

*Primary Examiner*—Stuart S. Levy
*Assistant Examiner*—William J. Klimowicz
*Attorney, Agent, or Firm*—Birch, Stewart, Kolasch & Birch, LLP

[57] ABSTRACT

An improved cassette tape holder locking apparatus for a video cassette tape recorder capable of achieving a better cassette tape placing operation by locking the cassette holder at both sides of a housing bracket, which includes a first holder locking member rotatably disposed to the side plate for limiting a loading operation of the cassette holder after the cassette holder is lowered; and a second holder locking member rotatably disposed at a deck surface of the opposed side of the side plate and driven by a drive member provided at the deck surface for limiting a lifting operation of the cassette holder.

1 Claim, 6 Drawing Sheets

CASSETTE HOLDER LOCKING APPARATUS FOR VIDEO CASSETTE TAPE RECORDER

This application is a continuation of application Ser. No. 08/559,487 filed on Nov. 15, 1995, now abandoned.

BACKGROUND OF THE INVENTION

1. Field of the Invention

The present invention relates to a cassette holder locking apparatus for a video cassette tape recorder, and particularly to an improved cassette holder locking apparatus for a video cassette tape recorder capable of achieving a better cassette tape placing operation by locking the cassette holder at both sides of a housing bracket.

2. Description of the Conventional Art

Referring to FIGS. 1, 2A and 2B, a conventional cassette housing of a video cassette tape recorder includes a housing bracket consisting of a front plate 1 and two side plates 2 and 2a.

X-shaped lever assemblies 7 and 7a, in each of which first levers 4 and 4a and second levers 5 and 5a connected by connection pins 6 and 6a are rotatably engaged to the both sides 2 and 2a of the housing bracket 3, respectively.

Both sides of a cassette holder 8, guided by the side walls 2 and 2a together with a loaded cassette tape, are engaged to an inner upper portion of the X-shaped lever assembly 7 and An inner upper portion of the X-shaped lever assembly 7a, respectively.

In addition, a shaft pin 10 is disposed at one side wall 2 of the housing bracket 3.

A locking lever 11 having an operation section 11a formed on a predetermined lower portion thereof is engaged to a predetermined portion of the side wall 2, the locking lever 11 being rotatably engaged to the shaft pin 10.

One side of the locking lever 11 is elastically connected to a lower portion of the second lever 4 by a spring 13.

In addition, an engaging pin 12 for selectively engaging to the locking lever 11 is rigidly engaged to one side wall of the cassette holder 8.

Meanwhile, a damper gear 14, performing a damping operation when the cassette holder 8 is closed/opened, is rotatably engaged to a rear portion of one side of the cassette holder 8, and a sector gear 15 is provided at one side of the upper portion of the first lever 4 so as to be engaged with the damper gear 14.

The operation of the conventional cassette housing of a video cassette tape recorder will now be explained with accompanying drawings.

To begin with, as shown in FIG. 2B, when the cassette holder 8 is pushed downwardly in an ejection mode, as shown in FIG. 2A and 3A, tension springs 9 and 9a are elastically extended, and the X-shaped lever assemblies 7 and 7a are folded, the locking lever 11 rotates in a clockwise direction and engages the engaging pin 12 provided at one side of the cassette holder 8, and the cassette holder 8 is maintained in a lowered position and is elastically supported.

At this time, the other side surface of the cassette holder 8, that is, in which an engaging pin is not provided, as shown in FIG. 3A, is elastically supported by a predetermined locking force from the opposing side of the cassette holder 8.

Meanwhile, on the contrary, when the cassette holder 8 is ejected, the operation section 11a provided at a lower portion of the locking lever 11 moves in the direction of "A" as shown in FIG. 2B, the locking lever 11 overcomes the elastic force of the spring 13 and rotates in a counterclockwise direction about the shaft pin 10.

Therefore, the locking lever 11 comes out of the engaging pin 12 provided at only one side of the cassette holder 8, and the X-shaped lever assemblies 7 and 7a, provided at both sides of the cassette holder 8 elastically supported by the engaging pin 12, elastically come off, and as shown in FIGS. 2B and 3B, the cassette holder 8 is ejected.

However, the conventional cassette housing of a video cassette tape recorder has disadvantages in that when the cassette holder is located at the housing bracket, since the cassette holder is locked by the locking lever only once provided at one side plate of the housing bracket 3, the other side of the cassette holder, in which the locking lever is not provided, is disadvantageously lifted by a little.

Therefore, it is impossible to achieve a more stable placement of a cassette tape therein because a supply reel side of the cassette holder is lifted by a little, so that a desired tape running performance cannot be achieved.

SUMMARY OF THE INVENTION

Accordingly, it is an object of the present invention to provide a cassette tape holder locking apparatus for a video cassette tape recorder, which overcomes the problems encountered in a conventional cassette tape holder locking apparatus for a video cassette tape recorder.

It is another object of the present invention to provide an improved cassette tape holder locking apparatus for a video cassette tape recorder capable of achieving a better cassette tape placing operation by locking the cassette holder at both sides of a housing bracket.

To achieve the above objects, there is provided a cassette holder locking apparatus for a video cassette tape recorder, which includes a first holder locking member rotatably disposed to the side plate for limiting a loading operation of the cassette holder after the cassette holder is lowered; and a second holder locking member rotatably disposed at a deck surface of the opposed side of the side plate and driven by a drive member provided at the deck surface for limiting a lifting operation of the cassette holder, thus achieving a more stable cassette tape placing operation by providing the holder locking member disposed at both sides of the cassette holder so as to lock the cassette holder in order, so that a better tape running state can be achieved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
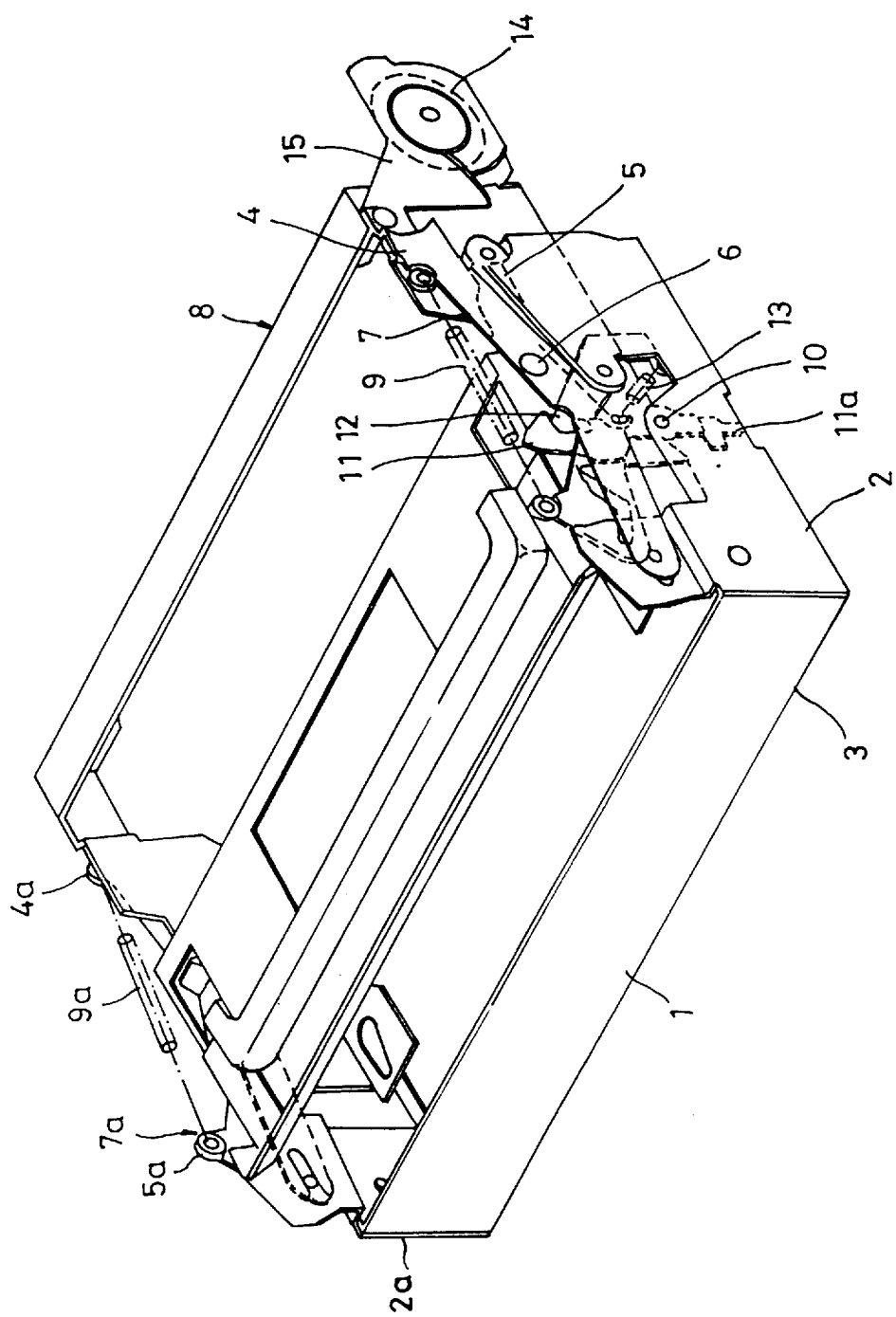
FIG. 1 is a perspective view showing a cassette housing of a conventional video cassette tape recorder.
Figure 2A:
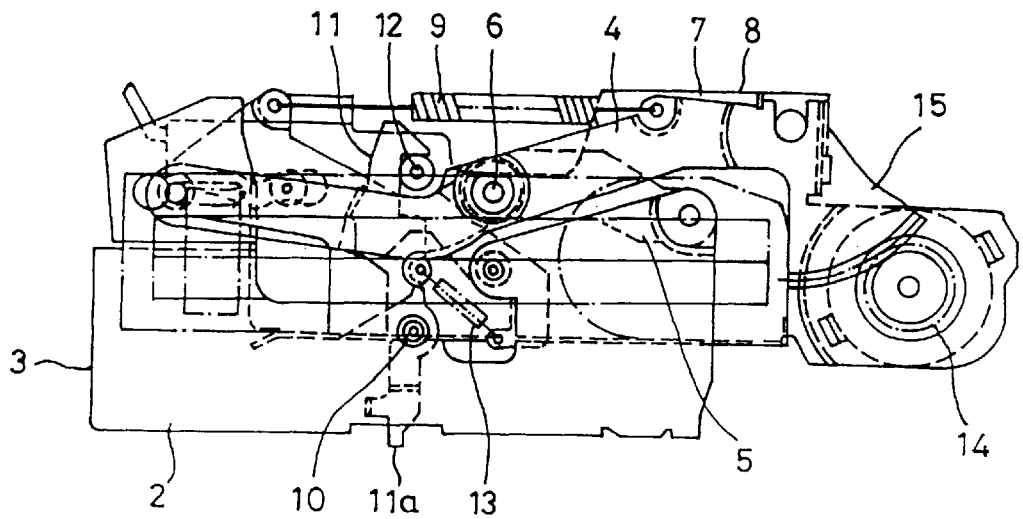
FIG. 2A is a side view showing a construction of a cassette housing of a conventional video cassette tape recorder.
Figure 2B:
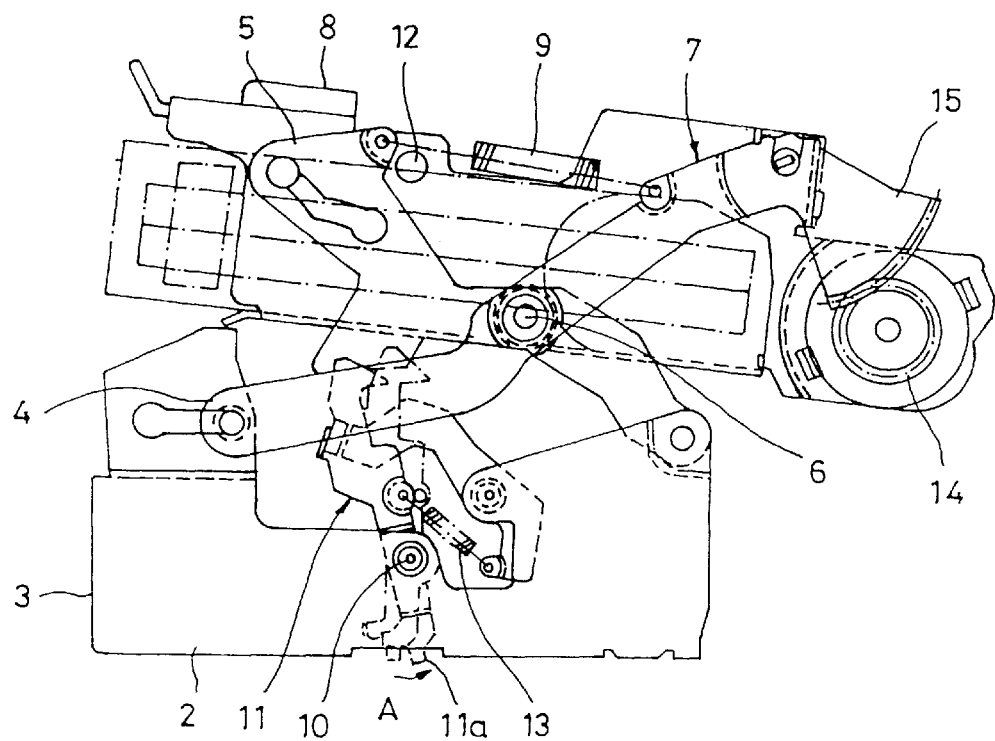
FIG. 2B is a side view showing an operation of a cassette housing of a conventional video cassette tape recorder.
Figure 3A:
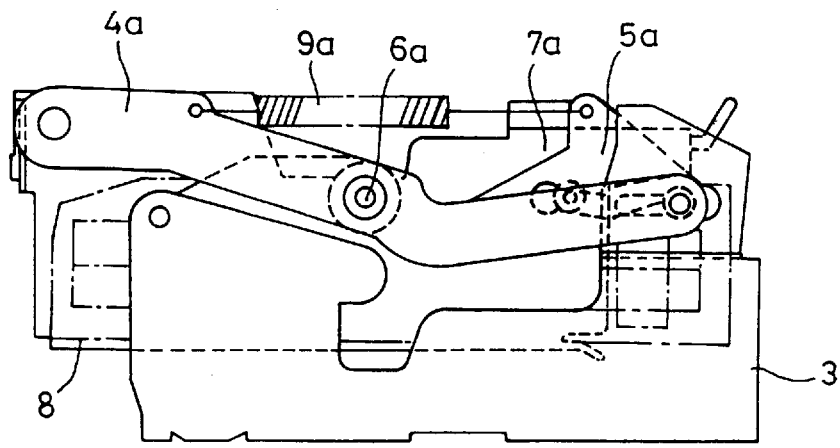
FIG. 3A is a side view showing a cassette holder placement state in a cassette housing of a conventional video cassette tape recorder when viewing from another side of FIG. 2A.
Figure 3B:
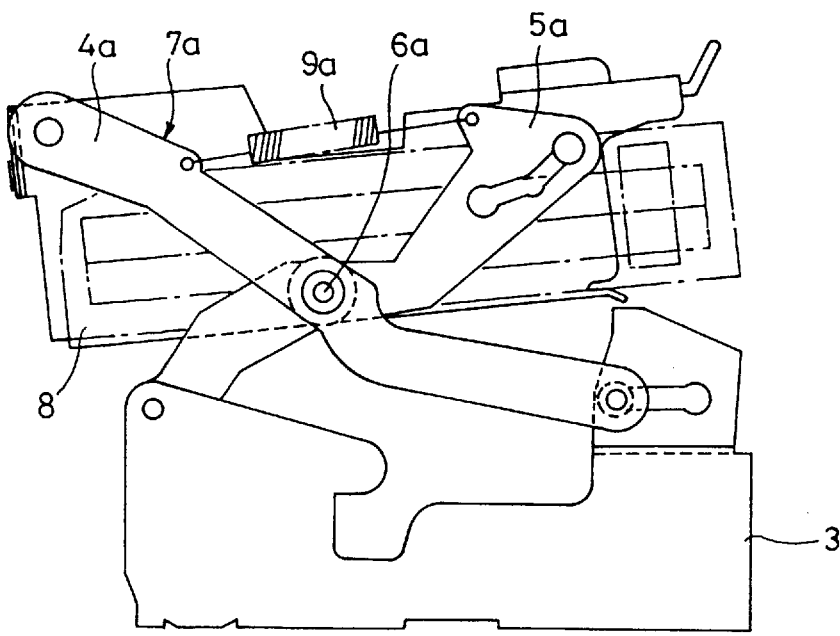
FIG. 3B is a side view showing an ejection mode of a cassette holder of a conventional video cassette tape recorder when viewing from another side of FIG. 2A.
Figure 4:
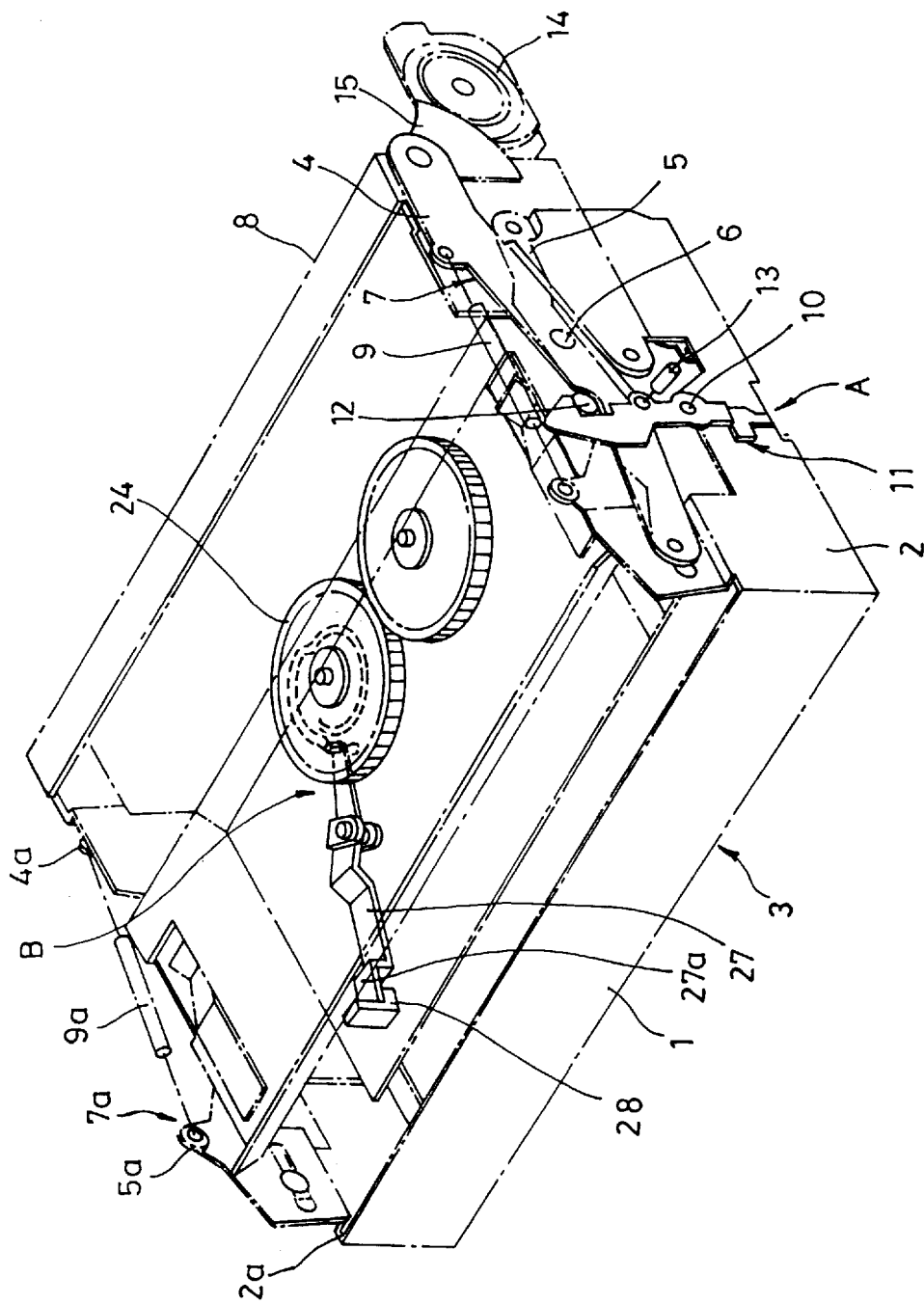
FIG. 4 is a perspective view showing a cassette housing of a video cassette tape recorder equipped with a cassette holder locking apparatus according to the present invention.

Referring to FIG. 4, a cassette holder locking apparatus according to the present invention includes a first holder locking member "A" which is provided to have the same construction as the conventional cassette holder locking apparatus, and a second holder locking member "B" which is provided according to the present invention.

The description of the first holder locking member "A" will now be omitted because it is described in the description of the conventional art.

Figure 5A:
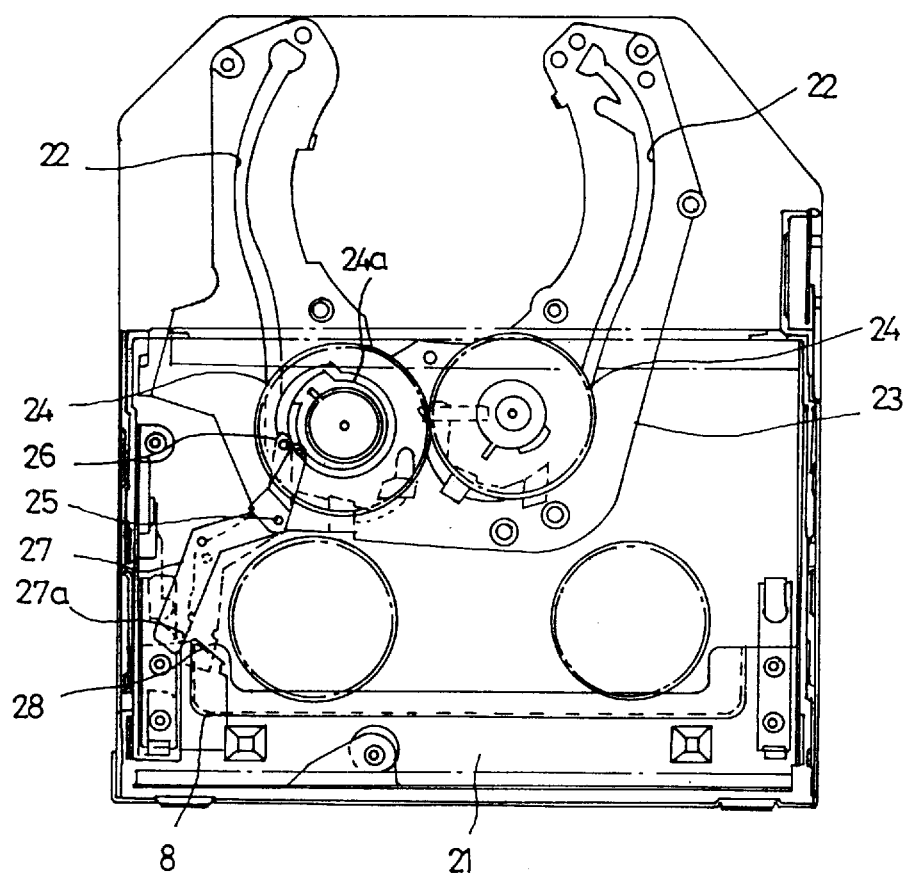
FIG. 5A is a plan view showing a second locking lever, before it moves, of a cassette holder locking apparatus of a video cassette tape recorder according to the present invention.
Figure 5B:
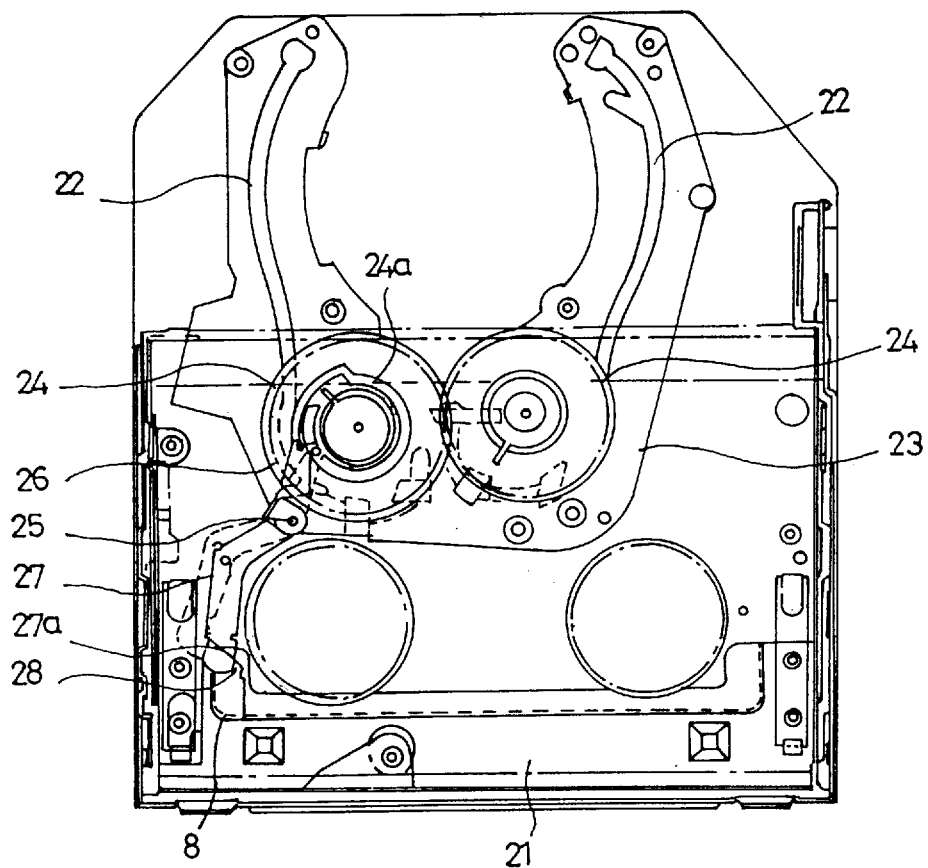
FIG. 5B is a plan view showing a second locking lever, after it moves, of a cassette holder locking apparatus of a video cassette tape recorder according to the present invention.

As shown in FIGS. 4, 5A and 5B, a loading base 23 having a loading groove 22 is provided at a rear portion of the upper surface of a main base 21.

Two loading gears 24 are rotatably engaged to both sides of the loading base 23.

The loading gears 24 rotate by a predetermined drive force, move along the loading groove 22 and drive a tape ejection member, so that a tape is wound around a head drum (not shown).

As shown in FIGS. 5A and 5B, a cam groove 24a is formed on the upper surface of the loading gear spaced-apart from the first holder locking member "A."

A shaft pin 25 is rigidly engaged to a predetermined corner portion of the loading base 23 spaced-apart from a side plate 2 in which the first holder locking member "A" is provided.

A second locking lever 27 is rotatably engaged to the shaft pin 25.

A cam pin 26 fixed to an upper portion of the second locking lever 27 is inserted into the cam groove 24a, and a curved member 27a is provided at a lower portion thereof.

An engaging member 28 is fixed to a predetermined lower portion of the cassette holder 8.

Figure 6:
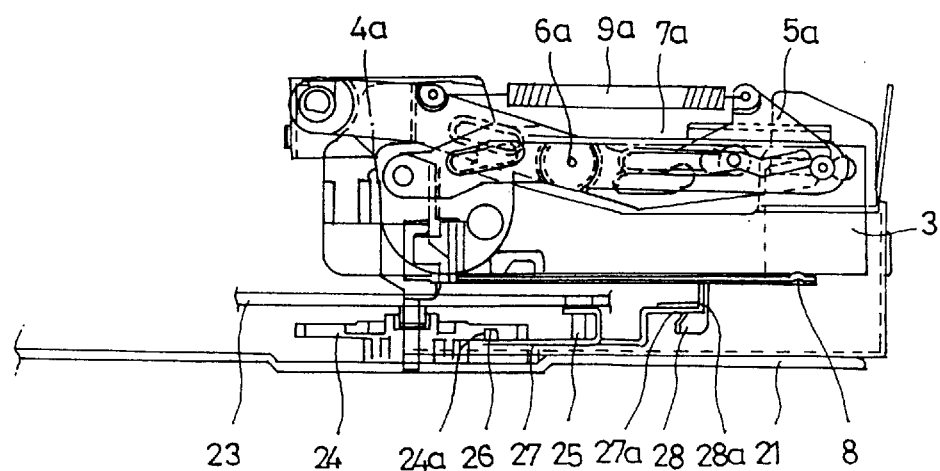
FIG. 6 is a side view showing an operation of a cassette holder locking apparatus of a video cassette tape recorder according to the present invention.

The engaging member 28 is curved at its central portion, and as shown in FIG. 6 has an engaging groove 28a.

The operation of the cassette holder locking apparatus for a video cassette tape recorder according to the present invention will now be explained.

To begin with, when the cassette holder 8 is pushed downwardly in an ejection mode, as shown in FIG. 4, tension springs 9 and 9a between first levers 4 and 4a and second levers 5 and 5a, respectively, are elastically extended, and X-shaped lever assemblies become folded, a first locking lever 11 moves in a clockwise direction so as to be engaged to an engaging pin 12 disposed at one side of the cassette holder 8, and the cassette holder 8 is locked, and the cassette holder 8 is lowered and elastically supported.

FIG. 5A shows a construction in which a placement operation of the cassette holder 8 is completed by the first holder locking member "A."

After the placement operation of the cassette holder 8 is completed by the first holder locking member "A", the cassette holder 8 is locked again by the second holder locking member "B."

After the operation of the first holder locking member "A" is completed, and the loading gear 24, located at a predetermined location substantially spaced-apart from the first holder locking member "A," moves in a clockwise direction by a predetermined drive force.

As shown in FIGS. 5A and 5B, the cam pin 26 movably inserted into the cam groove 24a moves a counterclockwise direction in accordance with a rotation of the loading gear 24.

Therefore, the second locking lever 27 rotates about the shaft pin 25, and as shown in FIG. 6, the curved member 27a of the second locking lever 27 is engaged to the engaging groove 28a formed on the engaging member 28 of the cassette holder 8, so that the cassette holder 8 is locked again, and the cassette holder 8 is elastically supported.

Accordingly, one side surface 2a, lifted a little by the first holder locking member "A," of the housing bracket 3 is advantageously tightly engaged.

Meanwhile, since the description of the ejection operation of the cassette holder 8 is executed in the reverse order of the placement operation of the cassette holder, it will be omitted.

As described above, the cassette holder locking apparatus for a video cassette tape recorder is capable of achieving a more stable cassette tape placing operation by providing the holder locking member disposed at both sides of the cassette holder so as to lock the cassette holder in order, so that a better tape running state can be achieved.

The invention being thus described, it will be obvious that the same may be varied in many ways. Such variations are not to be regarded as a departure from the spirit and scope of the invention, and all such modifications as would be obvious to one skilled in the art were intended to be included within the scope of the following claims.

What is claimed is:

1. A cassette holder locking apparatus used in combination with a video cassette tape recorder, said video cassette tape recorder including a housing bracket having a side plate, a cassette holder for receiving a cassette tape, and loading means engaged between said side plate of said housing bracket and the cassette holder for loading the cassette holder, said cassette holder locking apparatus comprising:

first holder locking means which engages a first portion of the cassette holder rotatably disposed to the side plate for limiting a lifting operation of the cassette holder after the cassette holder is lowered and driven by first drive means provided at said cassette holder, and second holder locking means engaging a second portion of the cassette holder rotatably disposed at a deck surface of an opposite side of the side plate to said first holder locking means and driven by second drive means which drive other parts of the video cassette recorder provided at said deck surface for limiting a lifting operation of the cassette holder;

wherein said first holder locking means is operated prior to said second holder locking means, wherein said second holder locking means includes:

a loading base having a loading groove;

a loading gear rotatably disposed at said loading base and having a cam groove:

a locking lever rotatably disposed at one side of the loading base and having a cam pin inserted into said cam groove: and an engaging member disposed at a predetermined lower portion of the cassette holder and selectively engaged by said locking lever, and wherein the engaging member is selectively engaged by the locking lever only when the loading gear has rotated through a prescribed angle to effect a tape loading operation and after the cassette holder is at a lowermost loading position.

* * * * *